United States Patent [19]

Honse

[11] 4,429,482
[45] * Feb. 7, 1984

[54] SIMULATED FISH SKIN AND FISHING LURE

[76] Inventor: James A. Honse, 211 Anita Forte Dr., Swansboro, N.C. 28584

[*] Notice: The portion of the term of this patent subsequent to Dec. 29, 1998 has been disclaimed.

[21] Appl. No.: 310,963

[22] Filed: Oct. 13, 1981

Related U.S. Application Data

[63] Continuation-in-part of Ser. No. 42,412, May 25, 1979, Pat. No. 4,307,531.

[51] Int. Cl.³ .............................................. A01K 85/00
[52] U.S. Cl. .................. 43/42.32; 43/42.24; 43/42.33
[58] Field of Search .................. 43/42.32, 42.3, 42.28, 43/42.33, 42.34, 42.24, 42.35

[56] References Cited

U.S. PATENT DOCUMENTS

| | | | |
|---|---|---|---|
| 1,921,176 | 8/1933 | Unkefer | 43/42.33 |
| 2,599,035 | 6/1952 | Wing | 43/42.33 |
| 2,737,750 | 3/1956 | Pierce | 43/42.33 |
| 2,741,058 | 4/1956 | Allman | 43/42.24 |
| 2,752,721 | 7/1956 | Denny | 43/42.33 |
| 2,951,308 | 9/1960 | Kent | 43/42.33 |
| 3,060,620 | 10/1962 | Binkowski | 43/42.24 |
| 3,122,853 | 3/1964 | Koonz et al. | 43/42.24 |
| 3,245,171 | 4/1966 | Henry | 43/42.24 |
| 3,413,750 | 12/1968 | Henry | 43/42.33 |
| 3,528,189 | 9/1970 | Lilley, Jr. | 43/42.33 |
| 3,540,144 | 11/1970 | Gurka | 43/42.33 |
| 3,611,614 | 10/1971 | Ward | 43/42.24 |
| 3,656,253 | 4/1972 | Gaunt | 43/42.33 |
| 4,215,506 | 8/1980 | LeBoeuf | 43/42.33 |
| 4,307,531 | 12/1981 | Honse | 43/42.32 |

FOREIGN PATENT DOCUMENTS

| 1315834 | 12/1962 | France | 43/42.24 |
|---|---|---|---|
| 1501858 | 10/1967 | France | 43/42.24 |

*Primary Examiner*—Nicholas P. Godici
*Assistant Examiner*—Kurt Rowan
*Attorney, Agent, or Firm*—Joseph P. Nigon

[57] ABSTRACT

Two layer simulated fish skin fishing lures having the flexibility, shape, reflective quality, iridescence, and other general features of a particular fish species desired prepared by embossing and metalizing a single layer of clear plastic material that has representations of eyes, fins, and spots thereon and joining the segments of the resultant material at the periphery.

5 Claims, 4 Drawing Figures

SIMULATED FISH SKIN AND FISHING LURE

CROSS REFERENCE TO RELATED APPLICATIONS

This application is a continuation-in-part of my co-pending application Ser. No. 42,412 filed May 25, 1979, now U.S. Pat. No. 4,307,531.

BACKGROUND OF THE INVENTION

I. Field of the Invention

This invention relates to simulated fish skin fishing lures, particularly simulated fish skin fishing lures having a single layer of plastic material. The lures may be used as a substitute for prepared whole natural bait fish or bait fish parts.

II. Prior Art

The prior art exhibits a large number of structures for fishing lures that are employed to simulate natural bait. The vast majority of these products are prepared to be rigid structures such as plugs, etc. U.S. Pat. No. 3,861,073 to Thomassin describes a flexible fishing lure. The essential feature of this product resides in the shape of the portion the inventor describes as the membrane portion and in the presence of the ridges and periphery of the membrane portion of this structure.

Other fishing lures that are more typical of the prior art include U.S. Pat. No. 3,540,144 to Gurka which describes a two-piece oval-shaped solid lure with an embossed insert therein. U.S. Pat. No. 3,631,625 to Castner describes another solid lure made of a transparent material that has spaced polarized film embedded therein. U.S. Pat. No. 3,528,189 to Lilley, Jr., discloses a solid fishing lure that includes a photograph in the interior of the oval-shaped structure.

U.S. Pat. No. 4,199,888 to Barnes relates to a combined sinker and fishing lure. The device is an elongated molded body preferably 5½ to 6½ inches long weighing about ¾ of a pound to one pound. The device has a reflecting tape attached thereto. U.S. Pat. No. 1,489,043 to Reinewald relates to an artificial fish bait consisting of a cylindrical bait body forward portion in the form of a declining front face. The device has a vertical slit that extends diagonally downward to facilitate attachment of the tail portion of the lure that is made up of soft rubber.

U.S. Pat. No. 3,186,120 to Layson discloses a structure that presents fish images in a manner that would result in the movement of these forms and would attract fish thereto.

SUMMARY OF THE INVENTION

The invention relates to simulated fish skin fishing lures, particularly simulated fishing lures having a single layer of plastic material. The objectives of this significant advancement over the prior art are:

(1) To provide a lower cost throw-away simulated fish skin fishing lure when the quarry sought is capable of biting and severely damaging any flexible plastic lure.

(2) To provide a lower cost simulated fish skin fishing lure for use in applications when corrosion of the reflective material is not of concern and when interaction between the lure and the quarry is so mild that the property of flexibility can be maximized at the expense of durability, thereby increasing the overall effectiveness of the lure in said application.

DETAILED DESCRIPTION OF THE INVENTION

The present invention comprises a simulated fish skin that simulates the appearance of natural fish and when combined or formed into a lure simulates the movement of a natural fish. The preferred structure comprises a simulated fish skin in the form of a fish having a forward portion and a rear portion having an outer layer of flexible plastic material and an inner layer of thin flexible reflective material integrated with the flexible plastic material. The forward portion is joined to present only one outer and one inner surface and the rear portion is made up of two separate portions. The essential features of the fishing lure are its flexibility, adaptability to a variety of shapes and reflective quality. It is particularly important that the fishing lure be made from a material that has a high reflective quality. This is important since water is an effective filter of light rays. While light contains all colors of the light spectrum from ultraviolet to infrared, certain parts of the spectrum can be removed from the remainder (for example, as in photographic filters). As the distance and/or depth of the water increases, the filtering process compounds, first at the red end of the spectrum and continuing down to the blue end. At a given distance or depth in water, certain parts of the light spectrum are therefore not available. The attractive quality of color is questionable and obviously limited since the color or colored light desired may not even exist. At 15 feet or less in sea water red objects appear brown or black.

It is well known from the teachings of the behavioral sciences and from empirical data that motion has an attention-gaining or attracting quality. There are many ways to achieve motion and ways to enhance its attracting quality. Flexibility is one and is often used in the manufacture of lures. Because the fishing lure of the instant invention is totally flexible, it enhances inherent or applied motion and greatly assists in the gathering of and dispersion of the available light.

The material used for the outer layer of the simulated fish skin should have the following properties: (1) it should be clear (preferably transparent); (2) it should be suitable for film-forming and/or extrusion; (3) it should be completely flexible; (4) it should be preferably suitable for heat-sealing; and (5) it should have a price which is not prohibitive.

Examples of suitable materials with their heat-sealing properties include:

| Material | Heat-Sealing Temperature |
| --- | --- |
| Polyvinylchloride | 250–350° F. |
| Medium density polyethylene | 250–400° F. |
| High density polyethylene | 260–425° F. |
| Polypropylene | 260–350° F. |
| Polycarbonate | 350–400° F. |
| Fluorinated ethylene | 575–700° F. |
| Vinyl fluoride | 400–425° F. |
| Polytrifluorochloroethylene | 325–375° F. |

Another material that is suitable under certain conditions is a linear polymeric ethylene glycol terephthalate product that is available under the tradename of "Mylar". This material heat-seals between 325° and 450° F.

The periphery of the outer layer of the simulated fish skin may be joined by stitching or with adhesive compositions. The most critical feature of the film used is its flexibility. The film should be of a thickness such that it is completely flexible.

The inner portion of the simulated fish skin can be any material that is thin, shiny and preferably adaptable to an embossed surface of numerous scale simulating facets for the reflection of light. Examples of suitable materials include metal foils such as aluminum. However, a less reflective decorative material may be used when simulating the skins of fishes having other than the aforementioned characteristics.

The simulated fish skin lures of the instant invention are particularly adapted for deep sea fishing. In deep sea fishing the quarry is capable of biting and severely damaging any flexible plastic lure. It is therefore an object of the present invention to provide a low cost simulated fish skin fishing lure than can be discarded when the fish is capable of biting and severely damaging any flexible plastic lure. In addition, it is an object of the present invention to provide a fish skin fishing lure for use in application where corrosion of the reflective material is not of concern and the interaction between the lure and the fish is so mild that the property of flexibility can be maximized at the expense of durability.

DETAILED DESCRIPTION OF THE DRAWINGS

Figure 1:
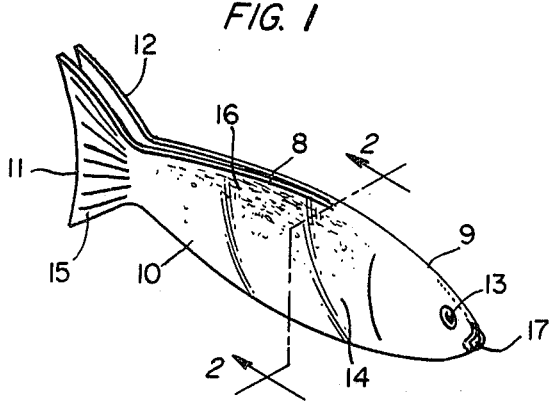
FIG. 1 is a perspective view of one of the preferred embodiments of my invention.

The three layered construction of the simulated fish skin fishing lure shown in the drawings is best suited for use in conditions where corrison of the reflective material is problematic, where its durability is a desired feature, and, in larger size lures, where the ratio between the length and thickness of the material provides a suitable degree of flexibility.

Referring now to FIG. 1 which shows a "skirt" embodiment 10 of my invention which is in the shape of a bait fish, the forward portion 9 is joined in a manner such that it presents only one outer and one inner surface. The rear portion 8, however, is made in a manner such that there are two separate portions 11 and 12. The appropriate layer is covered with identifying markings and typical features such as eyes 13, spots 14, fins 15, and color differences 16. The structure also has an aperture 17 to facilitate insertion of a leader in the preparation of the structure for fishing.

Figure 2:
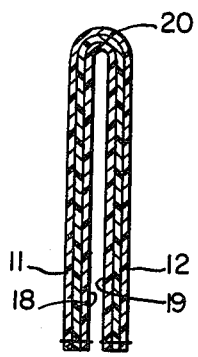
FIG. 2 is a cross-sectional view taken along lines 2—2 of FIG. 1 showing three layered construction.

Referring now to FIG. 2 which is a cross-section along lines 2—2 of FIG. 1 to show certain structural features. The exterior portions of the structure 11 and 12 cover the central portion 20 which is a layer of highly reflective material with the interior portions 18 and 19 which are of a clear flexible plastic material.

In the two layer modification of my invention, interior portions 18 and 19 are eliminated.

Figure 3:
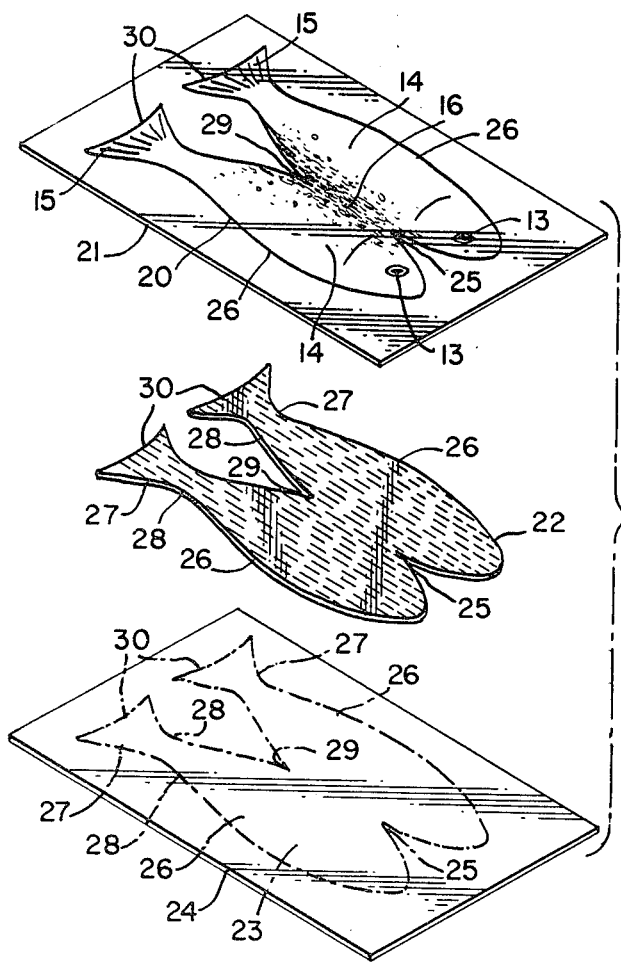
FIG. 3 graphically shows the steps in the manufacture of a three layered simulated fish skin product.

Referring now to FIG. 3, a pattern of a typical bait fish of the desired conformation and size is established on a sheet of clear, tinted or opaque flexible plastic material 21. When desired, identifying markings and typical features such as eyes 13, spots 14, fins 15, and color differences 16 are applied to the plastic sheet 21 in the appropriate areas by means such as indelible ink or other fast dye materials. When an iridescent quality is desired, sheet 21 is embossed with numerous scale simulating facets for the diffraction of reflected light. The same pattern is established of a thin shiny material on sheet 22. The flexible plastic material 21 is superimposed and integrated with the thin shiny material 22. In my two layer invention, layer 24 is eliminated. The two layer laminate is then folded over to form a simulated fish in the manner shown in FIG. 1.

The edges of the laminate are joined from the area 25 to 26. The joining of areas 27, 28, 29 and 30 individually to form the structure shown in FIG. 1 is not required in my two layer invention. It is obvious that the material may be severed in a line lying between the numerals 25 and 29 and elsewhere. In that case, these areas will be joined by stitching, heat sealing, and/or adhesives in action producing shapes.

Figure 4:
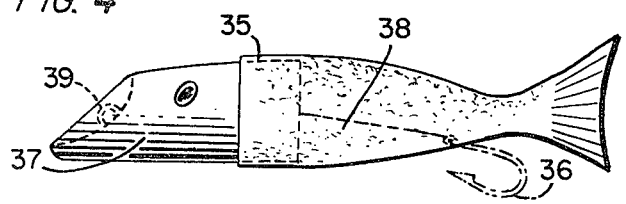
FIG. 4 shows another embodiment of my invention wherein my fish skin material is attached to a molded plastic lure head.

FIG. 4 shows another embodiment of my invention in which a portion of my fish skin structure 35 is attached by means of adhesive, by friction, or by any other suitable manner to a commercially available molded plastic structure in the form of a fish head.

The metalizing of the embossed flexible plastic material, sheet 21, can be accomplished by depositing aluminum on that material by the well-known vacuum chamber process.

The invention provides a simulated fish skin fishing lure for specific applications that demand the lowest possible cost of production.

What is claimed is:

1. A simulated fish skin lure consisting of two body halves with each half consisting of a single outer layer of clear plastic material and a single inner layer of a flexible reflective material, said halves being joined together to form a joined forward portion and a split rear portion, the halves of the forward portion form a single unitary head and the halves of the rear portion form a split tail.

2. The simulated fish skin lure of claim 1 wherein the outer layers are Mylar and the inner layers are aluminum.

3. The simulated fish skin lure of claim 1 wherein the forward portion is joined by stitching, adhesive bonding, or heat-sealing.

4. The simulated fish skin lure of claim 1 wherein the layers of flexible plastic material have representations of eyes, fins, and spots thereon.

5. The simulated fish skin lure of claim 1 wherein the materials are embossed with scale simulating facets for reflecting light thereon.

* * * * *